United States Patent
Brault et al.

(10) Patent No.: US 12,025,182 B2
(45) Date of Patent: Jul. 2, 2024

(54) FUSED SOFT AND HARD BEARING RINGS

(71) Applicant: SAFRAN AIRCRAFT ENGINES, Paris (FR)

(72) Inventors: Michel Gilbert Roland Brault, Moissy-Cramayel (FR); Julien Fabien Patrick Becoulet, Moissy-Cramayel (FR); Olivier Formica, Moissy-Cramayel (FR); Patrice Jean-Marc Rosset, Moissy-Cramayel (FR); Alexandre Jean-Marie Tan-Kim, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 163 days.

(21) Appl. No.: 17/906,930

(22) PCT Filed: Mar. 26, 2021

(86) PCT No.: PCT/FR2021/050535
§ 371 (c)(1),
(2) Date: Sep. 21, 2022

(87) PCT Pub. No.: WO2021/191571
PCT Pub. Date: Sep. 30, 2021

(65) Prior Publication Data
US 2023/0117756 A1      Apr. 20, 2023

(30) Foreign Application Priority Data

Mar. 27, 2020  (FR) ...................................... 2003072

(51) Int. Cl.
*F16C 33/58*      (2006.01)
*F01D 25/16*      (2006.01)
(Continued)

(52) U.S. Cl.
CPC .......... *F16C 33/583* (2013.01); *F01D 25/164* (2013.01); *F16C 19/54* (2013.01);
(Continued)

(58) Field of Classification Search
CPC ........ F16C 19/26; F16C 19/54; F16C 19/546; F16C 27/045; F16C 33/583; F16C 33/585;
(Continued)

(56) References Cited

U.S. PATENT DOCUMENTS 4,576,001 A       3/1986   Smith
10,844,746 B2 *  11/2020  Lefebvre ............... F16C 33/405
(Continued)

FOREIGN PATENT DOCUMENTS

EP      3 067 579 A1    9/2016
RU       1646354 C   *  6/1995  ............ F16C 27/045

OTHER PUBLICATIONS

International Search Report mailed Jun. 29, 2021, issued in corresponding International Application No. PCT/FR2021/050535, filed Mar. 26, 2021, 5 pages.
(Continued)

*Primary Examiner* — Phillip A Johnson
(74) *Attorney, Agent, or Firm* — CHRISTENSEN O'CONNOR JOHNSON KINDNESS PLLC

(57) ABSTRACT

An enclosure for a turbomachine includes a turbomachine drive shaft rotating about a longitudinal axis (X) by means of two roller bearings, an upstream bearing and a downstream bearing, each having an inner ring carried by the drive shaft. The two bearings share a single integral outer ring that has an upstream end and a downstream end connected to one another by a section of studs. The single outer ring is carried by an upstream base plate and a downstream base plate of a bearing support configured to be attached to a stationary structure of the turbomachine.

10 Claims, 2 Drawing Sheets

(51) Int. Cl.
  *F16C 19/54* (2006.01)
  *F16C 27/04* (2006.01)
(52) U.S. Cl.
  CPC .......... *F16C 27/045* (2013.01); *F16C 33/586* (2013.01); *F05D 2240/54* (2013.01); *F16C 2360/23* (2013.01)
(58) Field of Classification Search
  CPC . F16C 2360/23; F01D 25/264; F05D 2240/54
  See application file for complete search history.

(56) References Cited

U.S. PATENT DOCUMENTS

2008/0063333 A1* 3/2008 Bruno .................... F16C 19/49
  384/494
2013/0089284 A1 4/2013 Cazaux et al.
2018/0094675 A1* 4/2018 Grillo .................... F16C 19/54
2018/0298822 A1 10/2018 Ac et al.

OTHER PUBLICATIONS

Written Opinion mailed Jun. 29, 2021, issued in corresponding International Application No. PCT/FR2021/050535, filed Mar. 26, 2021, 5 pages.
English translation of Written Opinion mailed Jun. 29, 2021, issued in corresponding International Application No. PCT/FR2021/050535, filed Mar. 26, 2021, 5 pages.
International Preliminary Report on Patentability mailed Sep. 22, 2022, issued in corresponding International Application No. PCT/FR2021/050535, filed Mar. 26, 2021, 6 pages.

* cited by examiner

FUSED SOFT AND HARD BEARING RINGS

TECHNICAL FIELD

The present invention relates to the field of turbomachine bearing enclosures, in particular to the external ring of drive shaft bearings.

The invention falls within the general field of aircraft turbomachines.

PRIOR ART

The prior art is illustrated by the document US-A1-2013 089 284.

In a conventional manner and well known per se (see FIG. 1), an aircraft turbofan 10 comprises a fan 12 possibly connected to a reducer 14 itself connected to a drive shaft 16 extending along an axis of rotation X. This drive shaft 16 rotates in particular a low-pressure turbine 20. The low-pressure turbine 20 is located downstream of a high-pressure turbine 18 and is said to be at the rear of the turbomachine 10. The low-pressure turbine 20 is typically rotated by the drive shaft 16 by means of rolling bearings 22, 24. These rolling bearings 22, 24 are located within an enclosure 26 referred to as rear enclosure of the turbomachine. This rear enclosure 26 is highlighted in FIG. 1 of this application.

This rear enclosure 26 typically has an axial length of around 400 mm.

Classically and as illustrated in FIG. 2, the rear enclosure 26 comprises two rolling bearings 22, 24, an upstream bearing 22 and a downstream bearing 24, each bearing 22, 24 comprising an internal ring 28a, 28b and an external ring 29a, 29b. The internal rings 28a, 28b are carried by the drive shaft 16 of the turbomachine 10. The upstream external ring 29a is typically connected via a support ring 30 of an upstream centred damping fluid film (squeeze-film) to a first bearing support 32a (upstream bearing support) and the downstream external ring 29b is connected via a support ring 30 of a downstream centred damping fluid film to a second bearing support 32b (downstream bearing support), as seen in FIG. 2. The first bearing support 32a comprises a first upstream flange 100a intended to cooperate in attachment with a first downstream flange 100b of the second bearing support 32b. This cooperation is performed with conventional attachment means F known to anyone skilled in the art. The first bearing support 32a comprises a second flange (not shown) intended to cooperate in attachment with a first flange 26a (upstream flange) of the enclosure 26 and a flange Sofa stationary structure of the turbomachine 10 (see FIG. 1). Finally, the first bearing support 32a comprises a third flange 101 intended to cooperate in attachment with a flange 33 of the external ring 29a. The second bearing support 32b comprises a second support flange 102 intended to cooperate in attachment, by the attachment means F, with a second flange 26b (downstream flange) of the enclosure 26. The prior art device therefore has a total of nine flanges S, 33, 100a, 100b, 101, 102, 26a, 26b (and the flange not shown) allowing for connecting the upstream and downstream bearing supports 32a, 32b to the stationary structure of the turbomachine 10.

The principle of a soft bearing on a centred damping fluid film is to give the bearing a radial damping, a softness by means of the stud section and a centring, usually combined with a flange for its axial lock. The radial damping of the bearing by a fluid damping film per se will not be explained in this present application as this technique is known to anyone skilled in the art. In particular, dynamicians can individually adjust the softness of each bearing by calculating the size of the sections of studs, both in size and length.

The disadvantage of this rear enclosure 26 as it exists in the prior art is its axial overall dimension. The axial dimension of the rear enclosure 26 is mainly due to the constraints imposed by the overall dynamics. Indeed, the bearings 22, 24 are integrated into the enclosure 26 with softness (softness provided by a section of studs 34, see FIG. 2) which requires an incompressible axial length for each bearing 22, 24. Furthermore, again for reasons of overall dynamics, these bearings 22, 24 have a minimum distance to be respected between them.

The present invention aims in particular to propose an enclosure with a reduced axial overall dimension without weakening the overall dynamics, i.e. without impacting on the softness (and therefore the length of the studs) and without impacting on the distance between the two bearings.

DESCRIPTION OF THE INVENTION

This is achieved in accordance with the invention by means of a turbomachine enclosure comprising a turbomachine drive shaft rotatable about a longitudinal axis X by means of two rolling bearings, an upstream bearing and a downstream bearing each comprising an internal ring carried by the drive shaft. According to the invention, the two bearings share a single monobloc external ring, said single monobloc external ring comprising an upstream end and a downstream end, the upstream end and the downstream end being connected to each other by a section of studs, the single monobloc external ring being further carried by an upstream base plate and a downstream base plate of a bearing support which is adapted to be attached to a stationary structure of the turbomachine Thus, this solution allows to achieve the above-mentioned objective. In particular, there is a single external ring for both bearings. On the one hand, this allows to reduce the number of parts in the enclosure. This also has an impact on the design of the rolling bearing supports, as this external ring allows two out of three flanges to be removed. This minimises the overall dimension in thickness and in length of the enclosure while saving time, cost and simplifying mounting by reducing the number of parts. And all this while maintaining the functions linked to the bearings. The reduction in the number of flanges also makes the assembly harder.

The enclosure according to the invention may comprise one or more of the following characteristics, taken alone or in combination with each other:
- the upstream end of the single monobloc external ring has a radially external surface shrunk onto a radially internal surface of the upstream base plate,
- the upstream end of the single monobloc external ring cooperates with the upstream base plate of the bearing support, so as to provide a centring function for the single external ring,
- the single monobloc external ring is axially blocked by a stop annulus or by bolting the upstream end of the single monobloc external ring with the upstream base plate of the bearing support,
- a support ring of a damping fluid film is arranged radially between the downstream end of the single monobloc external ring and the base plate of downstream bearing support, the support ring and the downstream end forming a chamber intended to receive the damping fluid, the distance dP between the upstream bearing and a downstream end of the enclosure is between 250 and 300 mm, the bearing support has an upstream wall carrying the upstream base plate and a downstream wall carrying the downstream base plate, the upstream and downstream walls being connected to a wall of the enclosure by an external flange cooperating with a first flange of the wall of the enclosure, the downstream end of the single monobloc external ring is axially retained downstream by a retaining plate, and upstream by an upstream retention arranged on the downstream base plate, the enclosure is formed at least partly by an exhaust casing, the upstream bearing is a bearing referred to as hard, the downstream bearing is a bearing referred to as soft.

The invention also relates to an aircraft turbomachine comprising at least one enclosure according to the invention.

BRIEF DESCRIPTION OF THE FIGURES

The invention will be better understood, and other purposes, details, characteristics and advantages thereof will become clearer on reading the following detailed explanatory description of the embodiments of the invention given by way of purely illustrative and non-limiting examples, with reference to the attached schematic drawings.

On these drawings.

DESCRIPTION OF EMBODIMENTS

In the present detailed description, the same numerical references will be used for members and parts having the same functions as in the prior art, in order to simplify the reading and understanding of the present invention.

Figure 2:
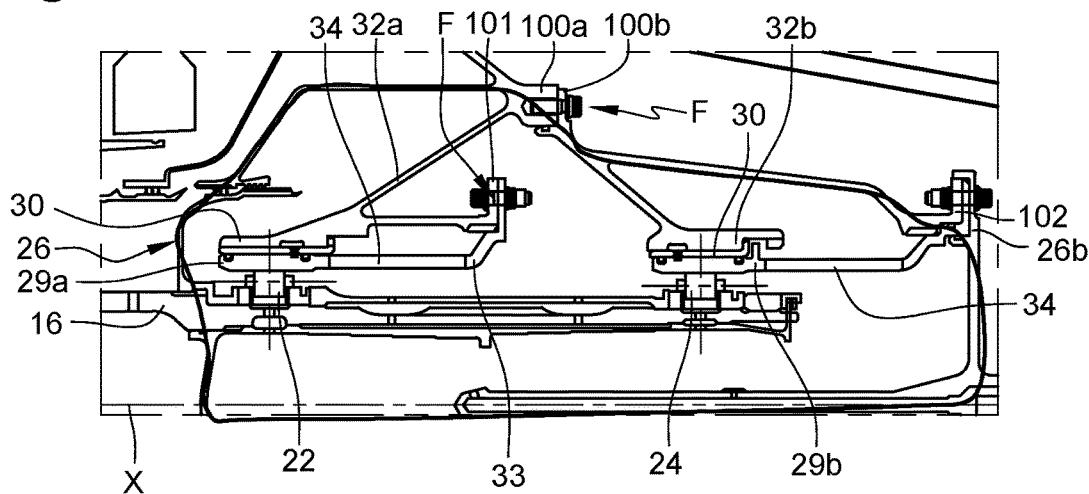
FIG. 2 is a schematic longitudinal cross-section of a turbomachine rear enclosure according to the prior art.
Figure 3:
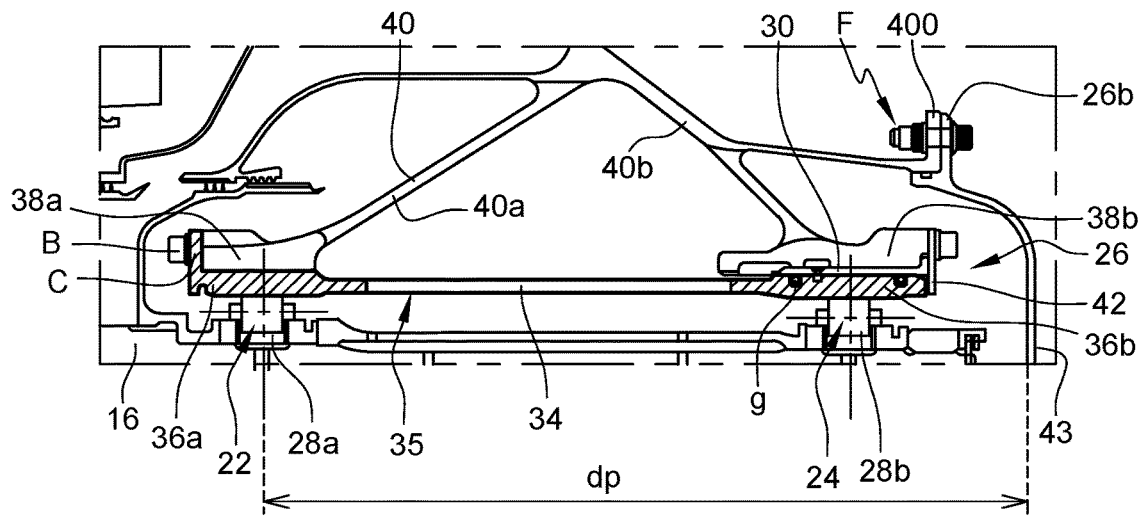
FIG. 3 is a schematic longitudinal cross-section of a turbomachine enclosure according to a first embodiment of the invention.

FIG. 3 shows that the enclosure 26 comprises the drive shaft 16 which rotates about the longitudinal axis X. This drive shaft 16 may be a low-pressure shaft of the turbomachine 10. The two rolling bearings 22, 24, (the upstream bearing 22 and the downstream bearing 24) are connected to the drive shaft 16. The enclosure considered in FIG. 3 is the rear enclosure of the turbomachine 10, more particularly an exhaust casing of this turbomachine 10. However, in contrast to the prior art, the two rolling bearings 22, 24 of the enclosure 26 share a single monobloc external ring 35 (one piece). In fact, the external rings 29a, 29b of FIG. 2 have been fused.

The single external ring 35 is generally cylindrical in shape and extends along the axis X. The single external ring 35 comprises an upstream end 36a and a downstream end 36b connected to the centre of the single external ring 35 by a section of studs 34.

The single external ring 35 is carried, at its ends 36a, 36b by two bearing support base plates 38a, 38b, respectively upstream and downstream, each attached to the stationary structure of the turbomachine 10. Thus, regardless of the embodiment, there is a reduction in the number of flanges of the bearing supports: indeed, the present invention allows to remove one to two flanges, which leads to a simplification of the manufacture of the bearing supports 22, 24 and to a simplification of the mounting of the assembly of the enclosure 26. The bearing supports 22, 24 can be obtained directly by casting or by additive manufacturing. The removal of various flanges/pairs of flanges from the prior art also provides a greater hardness to the bearing supports 22, 24 because in a mechanical element a pair of flanges provides the softness.

The upstream end 36a cooperates via a rolling with the internal ring 28a of the upstream bearing 22. The internal ring 28a is, as before, carried by the drive shaft 16. The upstream end 36a of the single external ring 35 is connected to an upstream end of a main bearing support 40 forming upstream bearing support base plate 38a and the downstream end 36b of the single external ring 35 cooperates, via a rolling, with the internal ring 28b of the downstream bearing 24. The downstream internal ring 28b is, as before, carried by the drive shaft 16. The downstream end 36b of the single external ring 35 is connected to a downstream end of the main bearing support 40 forming downstream bearing support base plate 38b. The two base plates 38a, 38b are thus connected to a wall of the enclosure 26 by the main bearing support 40, which is unique in this embodiment.

Figure 1:
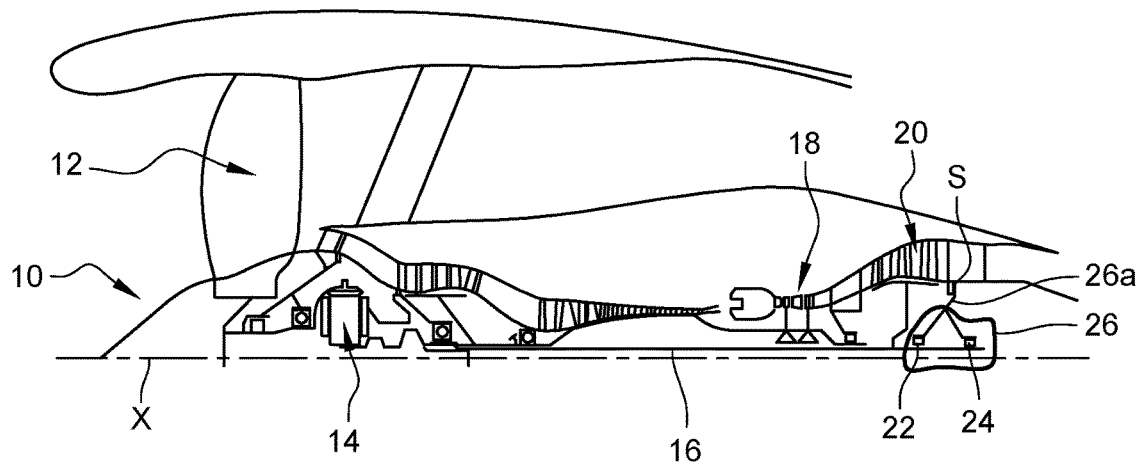
FIG. 1 is a schematic longitudinal cross-section of an aircraft turbomachine to which the invention applies.

The flanges 100a, 100b of the prior art no longer exist. The main bearing support 40 now has only two attachment flanges:

an external flange (not shown) intended to cooperate in attachment with the first flange 26a (upstream flange) of the enclosure wall 26 and the flange S of the stationary structure of the turbomachine 10 (shown in FIG. 1), an internal flange 400 intended to cooperate in attachment with the second flange 26b (downstream flange) of the enclosure 26 (see FIG. 3).

In particular, the bearing support 40 has an upstream wall 40a carrying the upstream base plate 38a and a downstream wall 40b carrying the downstream base plate 38b. The upstream 40a and downstream 40b walls are connected to the wall of the enclosure 26 by the external flange cooperating with the first flange 26a of the wall of the enclosure 26. The upstream 40a and downstream 40b walls form a single part with the bearing support 40. The upstream wall 40a is distant from the downstream wall 40b. Such a configuration of the bearing support 40 allows to reduce the number of parts and simplifies the turbomachine 10.

The three flanges S, 400, 26a are attached together by the conventional attachment means F, known to anyone skilled in the art.

There is a significant reduction in the number of attachment flanges. This means a significant saving of space. Indeed, in the present invention, there are two internal and external flanges 400 of bearing support 40, two flanges 26a, 26b of enclosure 26 and a flange S of the stationary support of the turbomachine 10.

So we have five flanges. Compared to the prior art with nine flanges, the number of flanges used is reduced.

There is also a strong axial gain: the fusion of the two external rings into a single external ring 35 in fact allows to reduce the axial overall dimension of the enclosure 26. Indeed, the axial distance dP taken along the axis X (considering the central axis of the bearing) separating the upstream bearing 22 from the downstream end of the enclosure 26 (defined by a radial wall 43) is reduced from a length of the order of 400 mm to a length of between 250 and 300 mm (see FIG. 3).

Furthermore, the upstream bearing 22 is a hard bearing and the downstream bearing 24 is a soft bearing. The overall dynamic is improved by the fact that the upstream bearing is now "hard" (instead of soft in the prior art), which also helps to simplify the mounting.

More specifically, the downstream bearing 24 is a bearing on a damping fluid film support ring 30 centred by means of the central section of studs 34, which allows the position of the downstream bearing 24 to be adjusted relative to the upstream bearing 22, the position of which is clamped to the upstream bearing support base plate 38a. The damping fluid film support ring 30 is arranged radially between the downstream end 36b of the single external ring and the downstream bearing support base plate 38b. This results in a soft downstream bearing 24.

The support ring 30 and the downstream end 36b form a chamber for receiving the damping fluid. More specifically, the downstream end 36b of the single external ring 35 comprises two annular grooves g each receiving a seal allowing to axially delimit the chamber. The damping fluid is, for example, an oil.

Figure 4A:
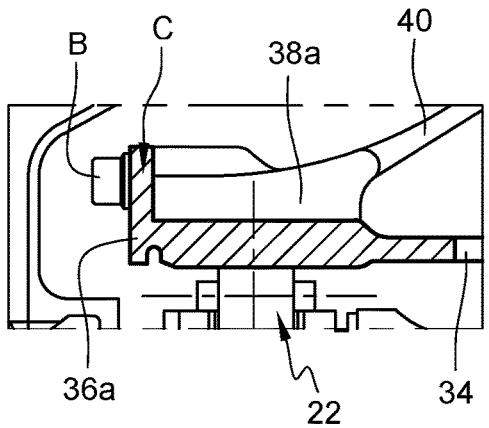
FIG. 4a is an enlargement of the upstream bearing according to the previous Figure.

The centring of the single external ring 35 is performed by the cooperation between the upstream end 36a and the upstream bearing support base plate 38a. Indeed, in the embodiment of FIG. 3 of the present invention, the upstream end 36a of the single external ring 35 is bolted, by means of a bolt B, to the upstream bearing support base plate 38a. Indeed, as can be seen in FIGS. 3 and 4a, it can be seen that the upstream end 36a of the single external ring 35 is equipped with a flange C. This centring flange C extends radially, from the external surface of the upstream end 36a, towards the outside of the turbomachine 10. This centring flange C is held in clamping cooperation with the upstream bearing support base plate 38a by means of the bolt B. The upstream bearing 22 is thus attached to the main bearing support 40 and thus to the static structure of the turbomachine 10.

The downstream bearing 24, on the other hand, remains soft to meet the need for overall dynamics. The required softness is performed by the section of studs 34 and the damping fluid film support ring 30 of the downstream bearing 24.

Figure 4B:
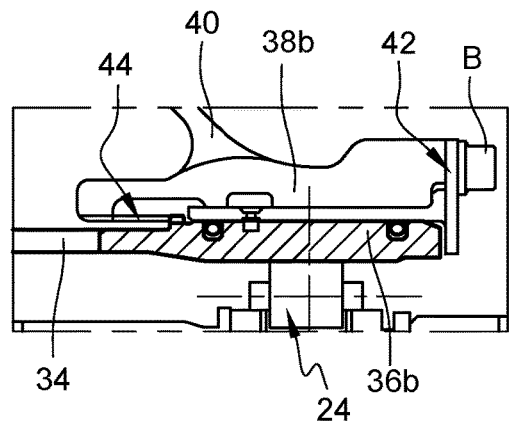
FIG. 4b is an enlargement of the downstream bearing according to FIG. 3.

In the event of a breakage of the studs of the section 34, the downstream end 36b of the single downstream external ring 35 is retained axially, downstream, by a retaining plate 42, and upstream by an upstream retention 44 arranged on the downstream base plate 38b (see FIG. 4b). The retaining plate 42 is supported on the downstream bearing support base plate 38b. The retaining plate 42 comprises a passage orifice of a bolt B allowing for securing the retaining plate 42 with the base plate 38b of bearing support 40. The retaining plate 42 extends radially to the downstream end 36b of the single external ring 35 forming axial stop. The upstream retention 44 is for example formed by an appendage of the downstream base plate 38b. The appendage extends upstream of the downstream base plate 38b.

Figure 5:
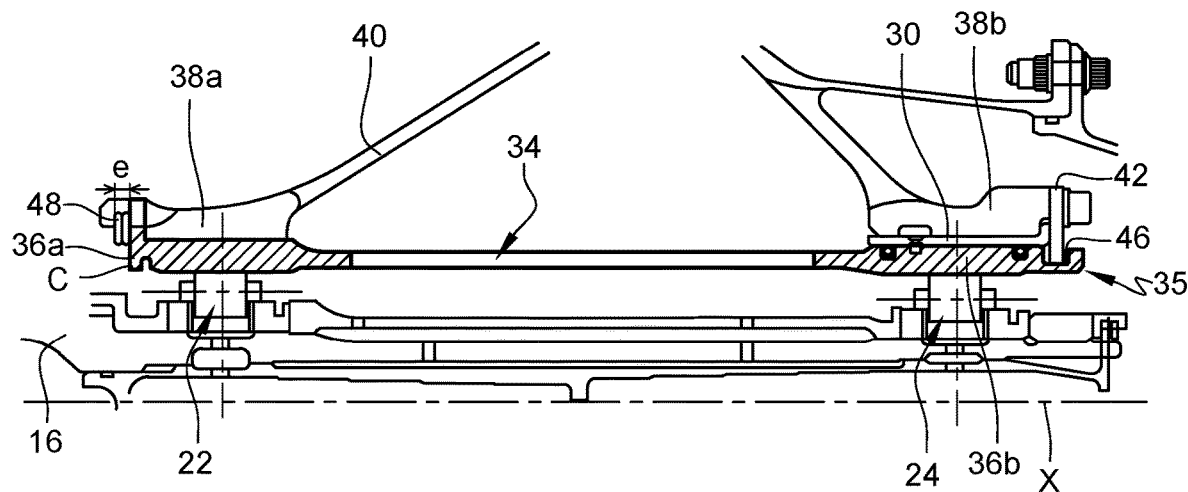
FIG. 5 is a schematic longitudinal cross-section of a turbomachine enclosure according to a second embodiment of the invention.

In the embodiment shown in FIG. 5, the downstream end 36b of the single external ring 35 has an external gorge 46 forming mortise intended to cooperate, by dimpling with the retaining plate 42 forming tenon. In the event of a breakage of the studs of the section 34, the single external ring 35 is held in place axially by the external gorge 46. A rotation stop (not shown) may optionally be integrated in either embodiment.

In the same embodiment shown in FIG. 5, the upstream end 36a of the single external ring 35 is retained axially against the upstream base plate 38a by a stop annulus 48. The main bearing support 40 is fitted into the flange C of the single external ring 35. For example, the upstream base plate 38a comprises a gorge that receives the flange C. The stop annulus 48 ensures an axial locking of the single external ring 35. The stop annulus 48 is a Spirolox© type annulus capable of withstanding high axial loads.

Figure 6:
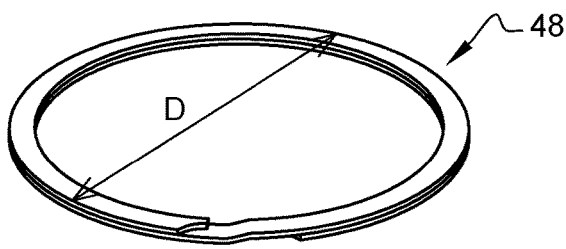
FIG. 6 is a perspective view of a stop annulus according to the second embodiment of the invention.

Indeed, the very high hardness of this type of annulus meets a strong need for mechanical strength of the single external ring 35. The stop annulus 48 may be spiral shaped and comprise, as shown in FIG. 6, two superimposed layers of a wound metal strip. This double winding allows to increase the resistance of the stop annulus 48 to axial loads.

The stop annulus 48, as shown in FIG. 6, is made in particular of carbon steel. The stop annulus 48 has a thickness e measured along the axis of the stop annulus 48 of between 2.5 mm and 4.5 mm and preferably of between 3.5 mm and 4 mm. The stop annulus 48 is for example housed in a groove provided in the upstream base plate 38a. The stop annulus 48 is supported on the flange C of the single external ring 35. The groove is preferably wider than the thickness of the stop annulus 48. Such a thickness of the stop annulus 48 gives it a high axial load compared to the annulus of the prior art. The stop annulus 48 preferably has an external diameter D of between 150 mm and 190 mm.

It can therefore be seen that whatever the embodiment considered, the present invention offers the following advantages:
- a reduction in the number of parts, resulting in both time savings during mounting and cost savings during production,
- a reduction in the number of support flanges resulting in a gain in hardness in the support of the bearings (as well as a gain in mass associated with this reduction),
- a compaction of the enclosure, resulting in a reduction in the axial overall dimension of the enclosure (and a gain in mass associated with this reduction in the overall dimension),
- an adaptation to the overall dynamics sought.

The invention claimed is:

1. An enclosure for a turbomachine comprising a turbomachine drive shaft rotatable about a longitudinal axis (X) by means of two rolling bearings, comprising an upstream bearing and a downstream bearing, each bearing comprising an internal ring carried by the drive shaft, wherein
the two bearings share a single monobloc external ring, said single monobloc external ring comprising an upstream end and a downstream end, the upstream end and the downstream end being connected to each other by a section of studs, the single monobloc external ring further being carried by an upstream base plate and a downstream base plate of a bearing support configured to be attached to a stationary structure of the turbomachine.

2. The enclosure according to the preceding claim 1, wherein the upstream end of the single monobloc external ring has a radially external surface shrunk onto a radially internal surface of the upstream base plate.

3. The enclosure according to claim 1, wherein the upstream end of the single monobloc external ring cooperates with the upstream base plate of the bearing support, so as to provide a centering function for the single external ring.

4. The enclosure according to claim 3, wherein the single monobloc external ring is axially blocked by a stop annulus or by bolting the upstream end of the single monobloc external ring with the upstream base plate of the bearing support.

5. The enclosure according to claim 1, wherein a support ring of a damping fluid film is arranged radially between the downstream end of the single monobloc external ring and the base plate of downstream bearing support, the support ring and the downstream end forming a chamber configured to receive the damping fluid.

6. The enclosure according to claim 1, wherein a distance (dP) separating the upstream bearing from a downstream end of the enclosure is between 250 and 300 mm.

7. The enclosure according to claim 1, wherein the bearing support has an upstream wall carrying the upstream base plate and a downstream wall carrying the downstream base plate, the upstream and downstream walls being connected to a wall of the enclosure by an external flange cooperating with a first flange of the wall of the enclosure.

8. The enclosure according to claim 1, wherein the downstream end of the single monobloc external ring is retained axially, downstream, by a retaining plate, and upstream by an upstream retention arranged on the downstream base plate.

9. The enclosure according to claim 1, wherein the enclosure is formed at least partly by an exhaust casing.

10. An aircraft turbomachine comprising at least one enclosure according to claim 1.

* * * * *